United States Patent [19]

Novikoff

[11] Patent Number: 5,472,269
[45] Date of Patent: Dec. 5, 1995

[54] MODULAR FURNITURE SYSTEM

[75] Inventor: Leon Novikoff, Fort Worth, Tex.

[73] Assignee: Novikoff, Inc., Fort Worth, Tex.

[21] Appl. No.: 245,233

[22] Filed: May 17, 1994

Related U.S. Application Data

[63] Continuation of Ser. No. 987,029, Dec. 7, 1992, abandoned.

[51] Int. Cl.$^6$ ............................................. A47B 27/00
[52] U.S. Cl. ........................ 312/263; 312/265.5; 312/195; 403/409.1
[58] Field of Search ................................ 312/263, 265.5, 312/406.2, 108, 111, 195; 403/252, 405.1, 407.1, 409.1

[56]   References Cited

U.S. PATENT DOCUMENTS

| | | | |
|---|---|---|---|
| 2,206,353 | 7/1940 | Hill | 312/108 |
| 2,272,507 | 2/1942 | Bullard | 312/263 X |
| 2,358,160 | 9/1944 | Haack | 449/27 |
| 2,612,590 | 9/1952 | Lachowicz | 312/107 X |
| 2,646,326 | 7/1953 | Stanitz | 108/27 |
| 2,646,735 | 7/1953 | Brunnen | 108/4 |
| 2,658,810 | 11/1953 | Ellis et al. | 312/238 |
| 2,661,994 | 12/1953 | Knuth | 312/107 |
| 2,891,639 | 6/1959 | Betts | 312/107 X |
| 2,967,747 | 1/1961 | Bus | 312/265.5 |
| 2,970,872 | 2/1961 | Ullman, Jr. | 108/27 |
| 2,980,480 | 4/1961 | Jacobs et al. | 312/114 X |
| 3,331,623 | 7/1967 | Baresel-Bofinger | 403/231 |
| 3,389,666 | 6/1968 | Schultze-Bonatz | 312/257.1 X |
| 3,429,630 | 2/1969 | Katz | 312/245 X |
| 3,563,624 | 7/1969 | Stice | 312/111 |
| 3,696,760 | 10/1972 | Riley | 312/239 X |
| 3,862,809 | 1/1975 | Bodner | 403/407.1 |
| 3,884,002 | 5/1975 | Logie | 403/292 X |
| 3,922,045 | 11/1975 | Meyer | 312/111 X |
| 3,974,610 | 8/1976 | Logie | 312/263 X |
| 4,012,880 | 3/1977 | Logie | 52/585 |
| 4,047,822 | 9/1977 | Lehmann | 403/245 X |
| 4,116,573 | 9/1978 | Fuchs | 403/264 |
| 4,127,353 | 11/1978 | Busse | 312/264 X |
| 4,197,029 | 4/1980 | Barreau et al. | 403/253 |
| 4,202,645 | 5/1980 | Giovannetti | 403/407.1 |
| 4,266,882 | 5/1981 | Wilhelmi et al. | 403/407.1 X |
| 4,299,067 | 11/1981 | Bertschi | 403/296 |
| 4,405,253 | 9/1983 | Stockum | 403/231 |
| 4,418,967 | 12/1983 | Winkelmann, Jr. et al. | 312/107 |
| 4,518,278 | 5/1985 | Koch | 403/407.1 X |
| 4,536,044 | 8/1985 | Ziegelheim et al. | 312/111 X |
| 4,558,553 | 12/1985 | Kolk | 108/27 |
| 4,606,170 | 8/1986 | Mendenhall | 211/135 X |
| 4,634,309 | 1/1987 | Dewey | 403/407.1 |
| 4,650,261 | 3/1987 | Winter et al. | 312/140 |
| 4,660,901 | 4/1987 | Shimada | 312/111 |
| 4,728,215 | 3/1988 | Martincic et al. | 403/407.1 X |
| 4,741,135 | 5/1988 | Baena | 403/407.1 |
| 4,783,189 | 11/1988 | Bugg | 403/407.1 X |
| 4,966,424 | 10/1990 | Schneider | 312/265.6 |

Primary Examiner—Timothy V. Eley
Assistant Examiner—Khan V. Nguyen
Attorney, Agent, or Firm—Charles D. Gunter, Jr.

[57]   ABSTRACT

A modular furniture system is shown which features a series of panels which can be manufactured and shipped in a knock-down condition. Various connecting accessories provide improved wire management capabilities and allow a variety of modular configurations to be assembled from a small number of component parts. An improved connector allows vertical support panels of adjacently arranged modules in the system to be connected without requiring holes to be drilled in the exposed edges thereof.

4 Claims, 9 Drawing Sheets

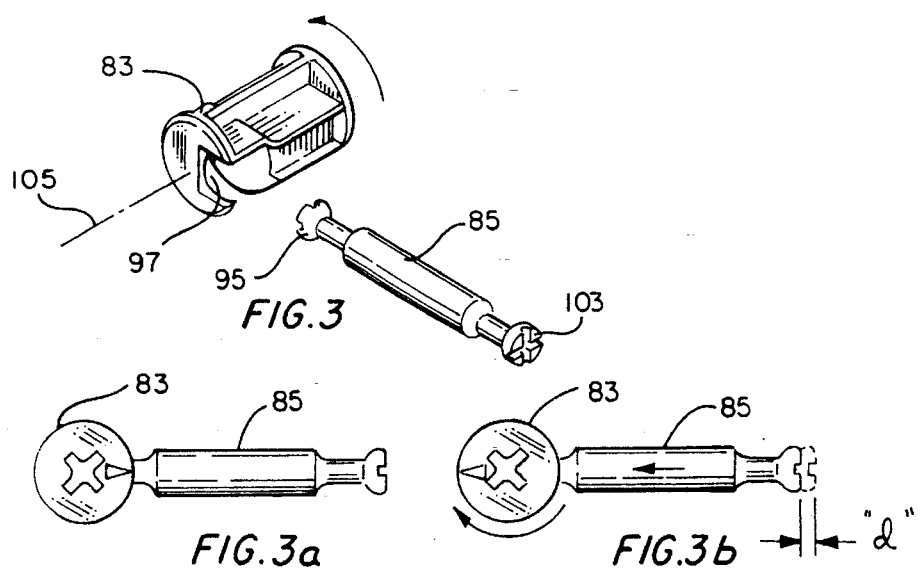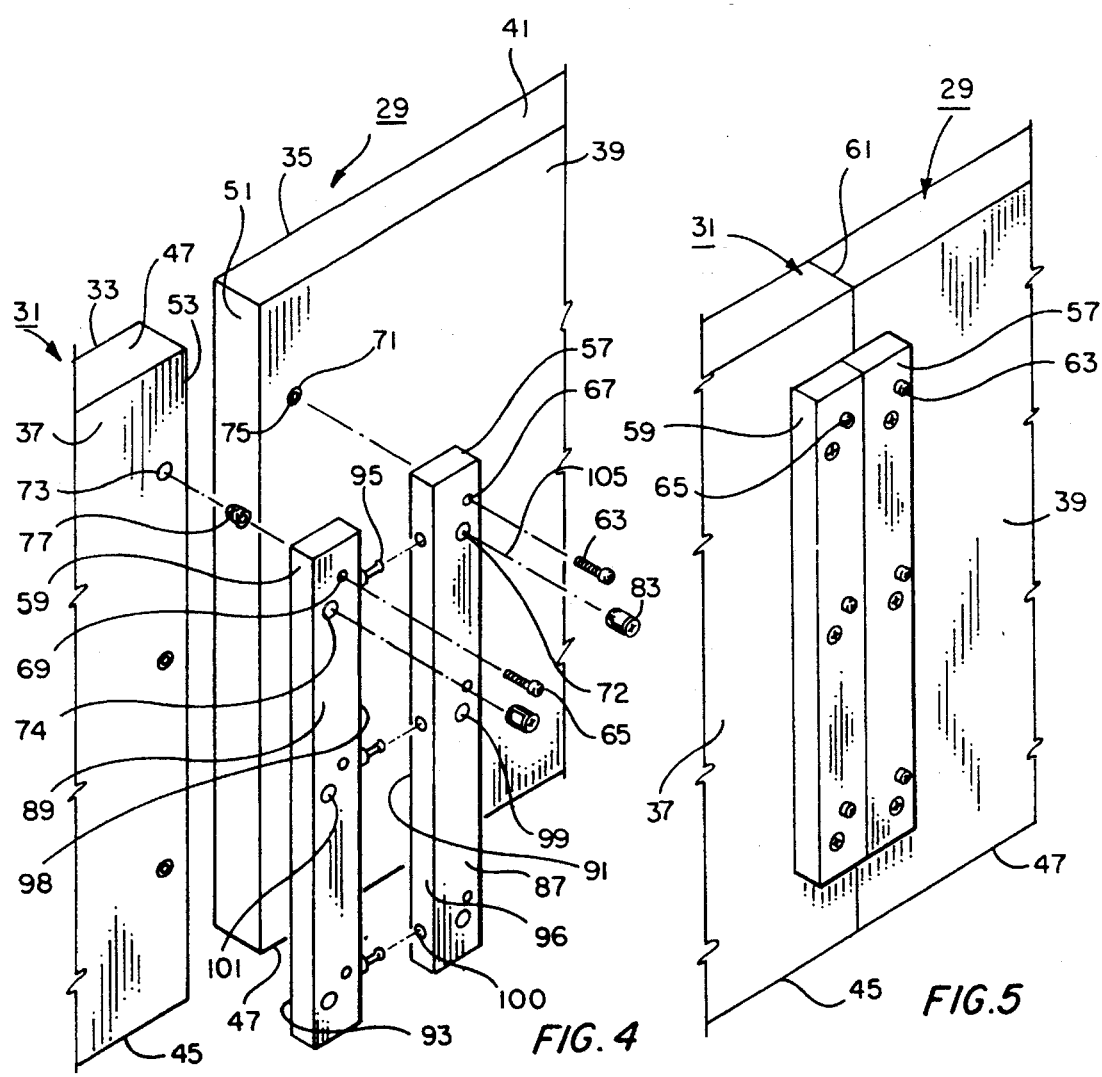

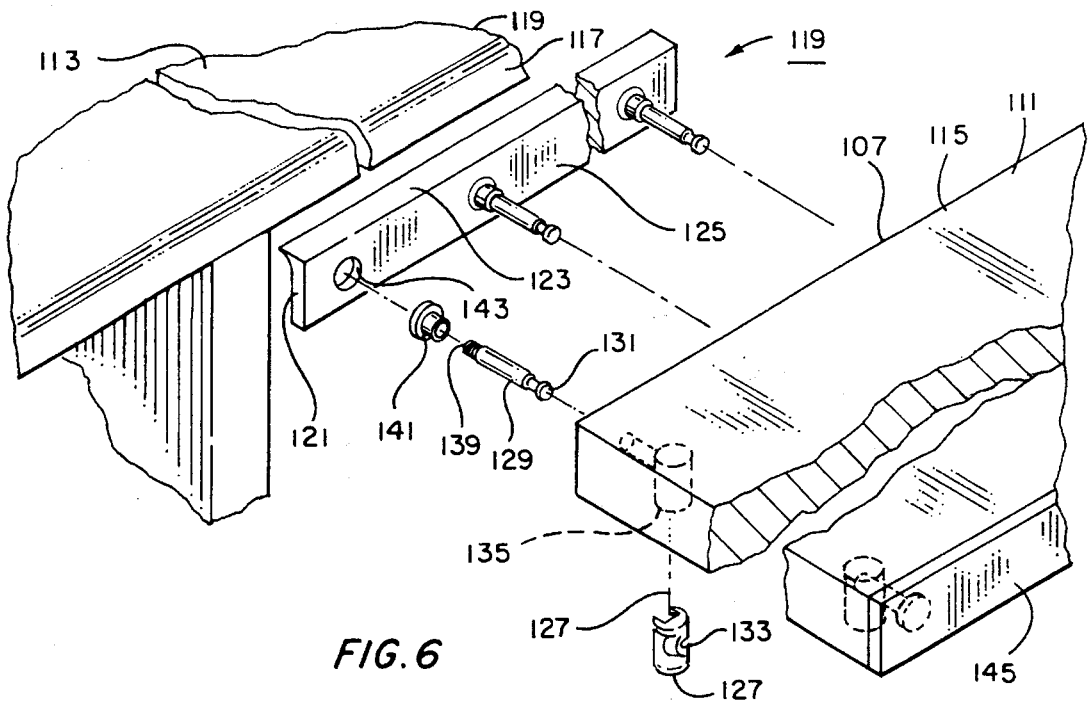
FIG. 6
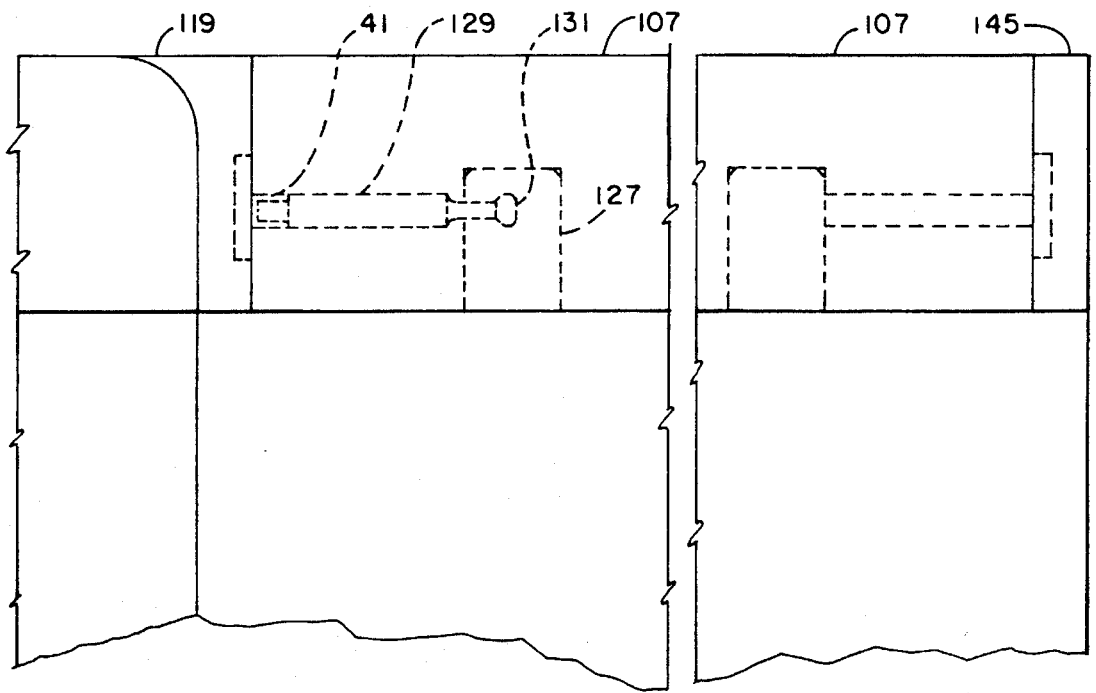
FIG. 7
FIG. 8

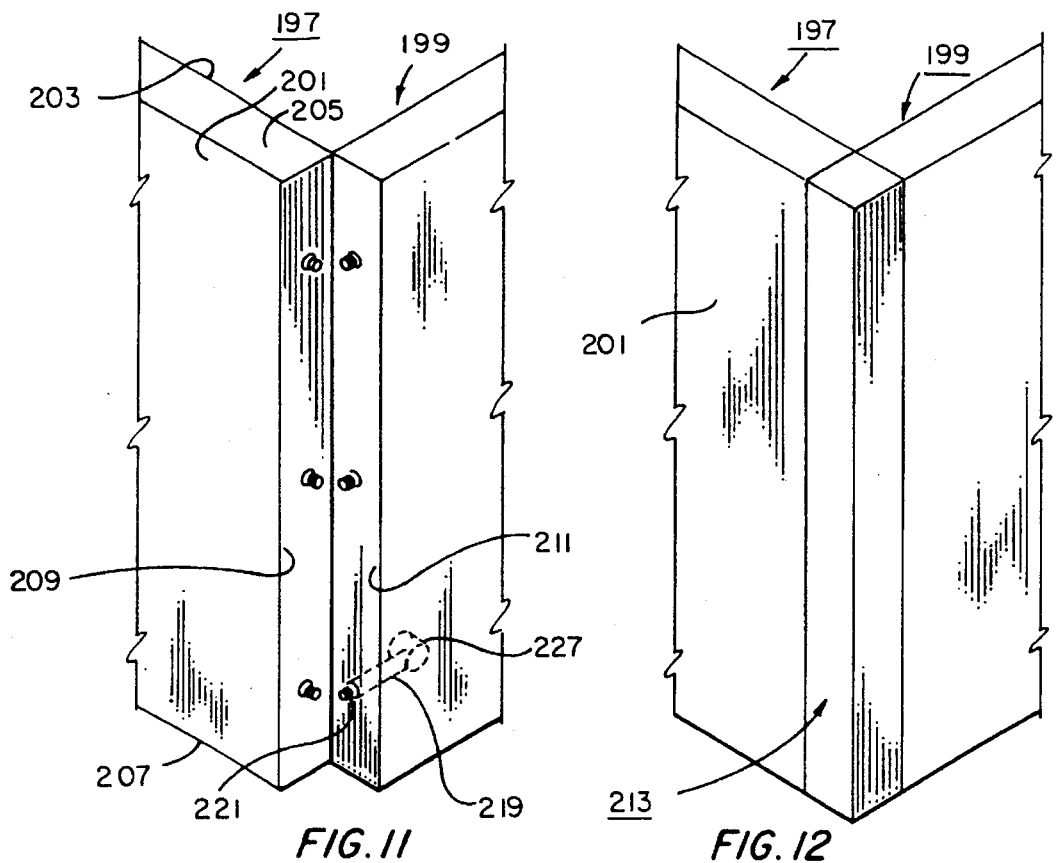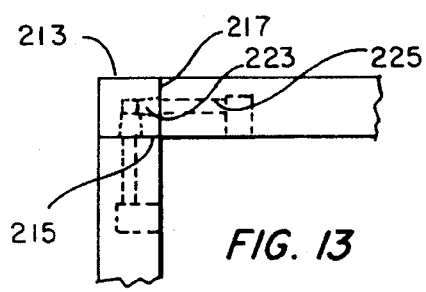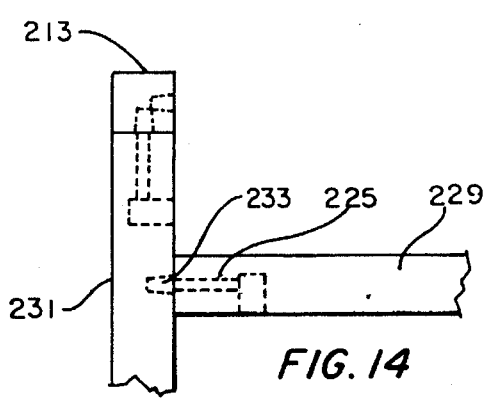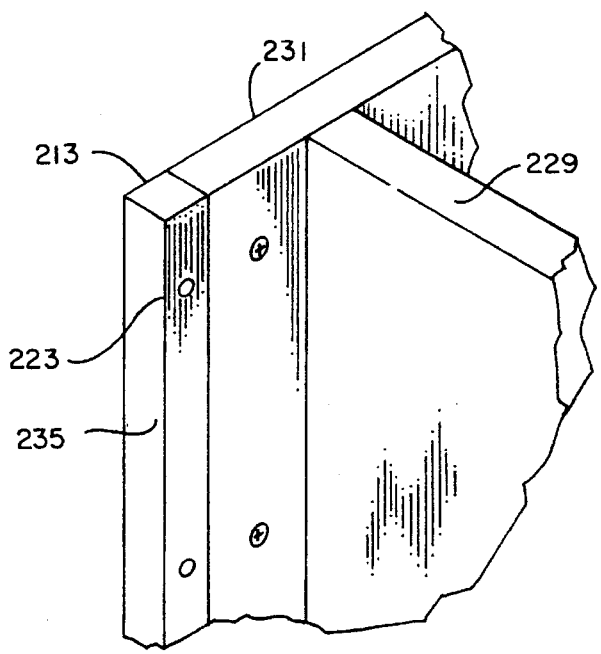

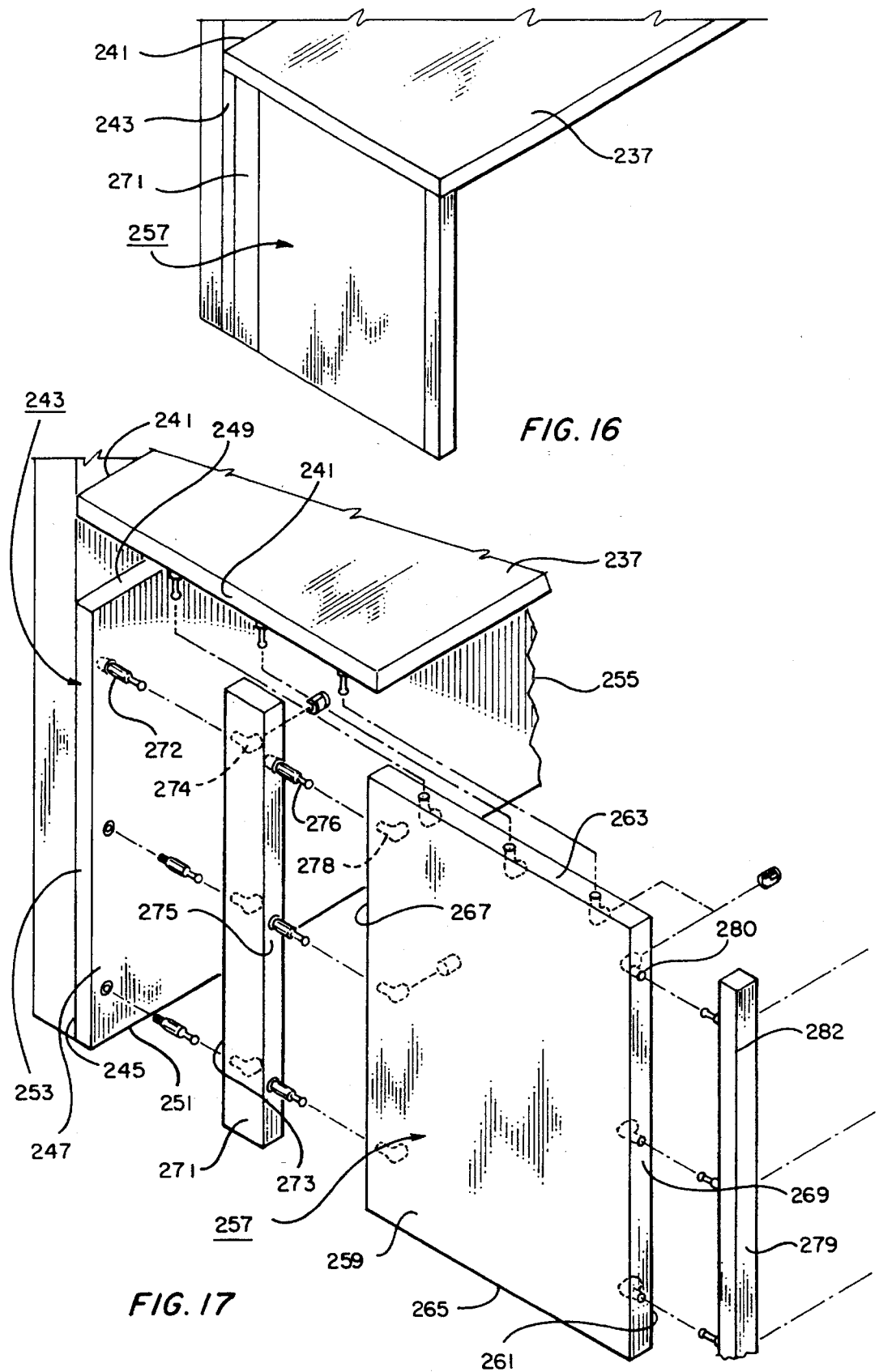

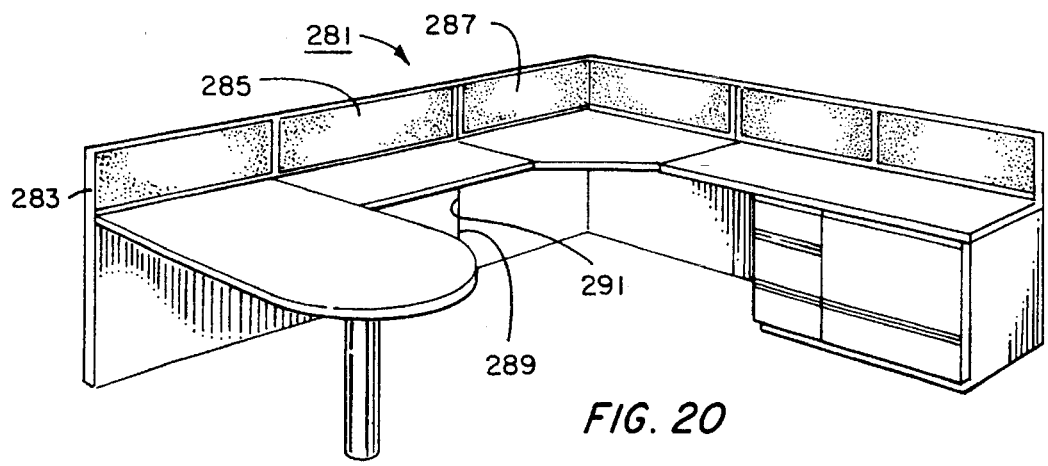
FIG. 20
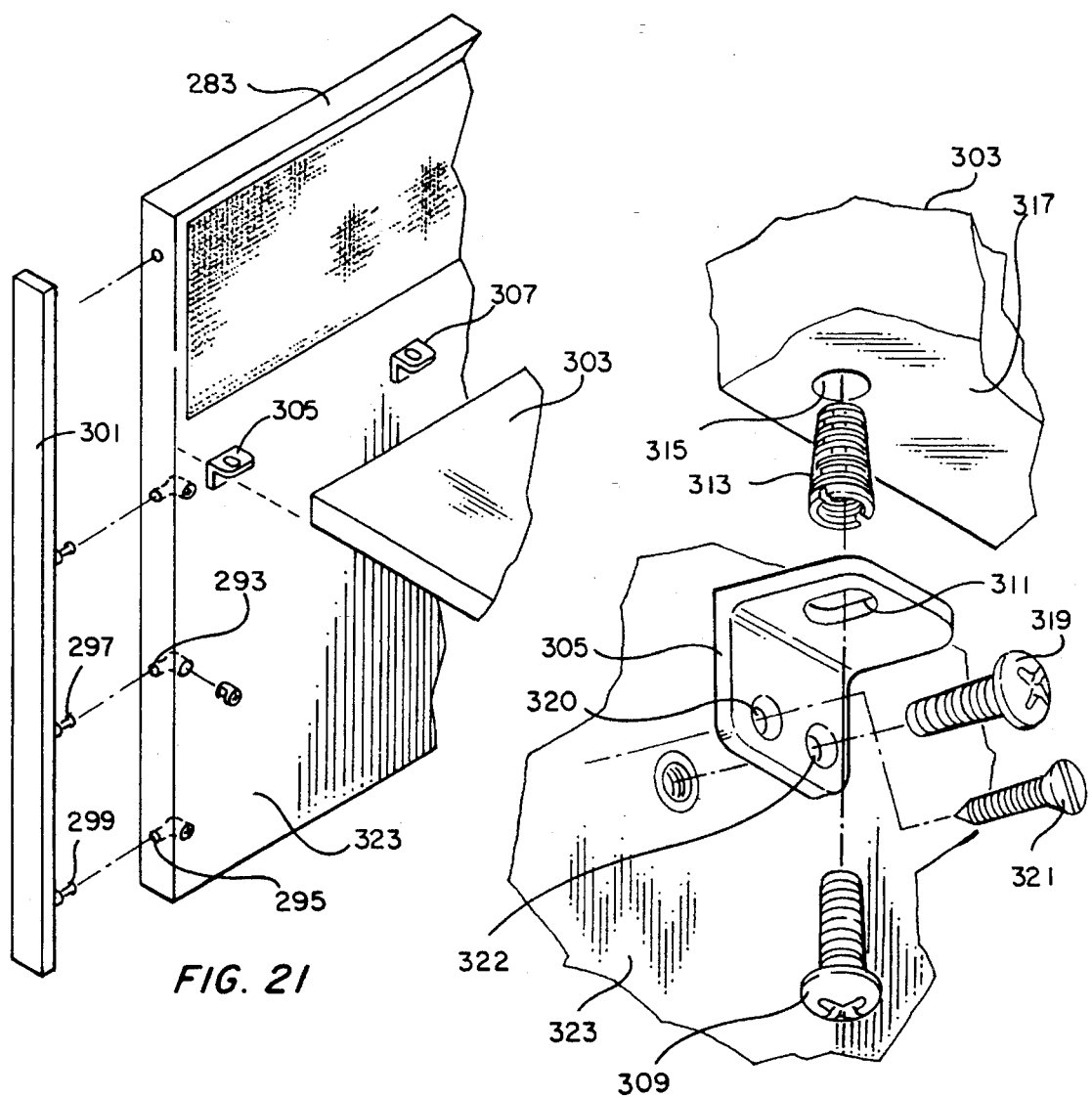
FIG. 21
FIG. 22

5,472,269

MODULAR FURNITURE SYSTEM

This is a continuation of application Ser. No. 07/987,029, filed Dec. 7, 1992 now abandoned.

BACKGROUND OF THE INVENTION

1. Field of the Invention:

The present invention relates generally to modular furniture systems of the type which can be manufactured in the form of knock-down panels in order to provide ease of assembly and which can be easily reconfigured to meet a variety of needs.

2. Description of the Prior Art:

A large variety of ready-to-assemble furniture systems are commercially available at the present time. While such systems do feature ease of assembly, they have often not exhibited the appearance of factory-assembled furniture. For example, certain of the prior art ready-to-assemble systems have exhibited the tendency to loosen up or come apart after extended use. Such systems have included, for example, wood-based office furniture such as desks, credenzas, book cases, lateral files, computer stands, and the like. While such systems offered ease of assembly, they were not necessarily directed toward facilitating the reconfiguration of component parts of a modular furniture system. There are a number of reasons why an easily reconfigurable system would offer advantages not presently available in today's commercial furniture market.

Especially in the office furniture market, a manufacturer must offer a variety of available choices in the components of the furniture system. Depending upon the office layout, a workstation may require various configurations. For example, a workstation may be comprised of only a desk or it may be a desk with a return, or a desk with a top unit stacked on the desk. Whatever the desired configuration, the manufacturer and dealer are faced with the problem of offering a wide variety of styles as well as a wide selection of configurations within each style.

Stocking a wide variety of workstation styles and configurations poses many problems. One problem is the storage space required in the showroom or warehouse. Also, manufacturing a variety of custom configurations is very expensive.

Various attempts have been made in the prior art to remedy the above noted deficiencies. However, the prior art modular furniture systems have tended to be overly complex in construction. One attempt to simplify such constructions is to provide the modular system in the form of knock-down panels. In such systems, the unit is marketed in an unassembled condition with the final assembly being made by either the dealer or the end user. Knock-down units are more compact in storage, allowing for storage of more than one unit in the space that a conventional fully assembled unit would occupy. However, because the prior systems have not generally featured any method for interchanging the components of the system such as returns, stackable units and the like, such systems have not provided the number of configurations required by today's office furniture market. The prior art constructions have not generally provided the extent of modularity from which a large number of workstation configurations can be provided by using a relatively small number of basic components.

An object of the present invention is to provide a modular furniture system featuring new and improved workstations which are easily reconfigured.

Another object of the invention is to provide new and improved modular components which allow the assembly of a relatively large number of different workstation configurations from a relatively few different configurations of modular components.

Another object of the invention is to provide a plurality of workstation configurations from a relatively small number of basic modular components which are fabricated for shipment in knock-down condition and which are fabricated for assembly in the field with relative ease.

Another object of the invention is to provide an improved modular furniture system for assembling a basic workstation in the form of a desk in which additional components can be added to the basic desk workstation to provide other configurations of workstations as the end user's requirements may demand.

Another object of the invention is to increase the flexibility to change configurations without marring the attractiveness of the components of the system by providing a connection means for the panel components which does not require boring holes in the end surfaces of the panels.

Another object of the invention is to provide an edge cap for the system components which allows edges of the system components to fit together against flat edged surfaces, radiussed edged surfaces and other custom designed surfaces.

Another object of the invention is to provide improved wire management capabilities within a modular furniture system by allowing access to wall outlets while keeping the components of the system positioned against a wall, thereby concealing all wires and cables.

Another object of the invention is to provide an improved means for allowing the inlet of wire and cable to the inside of a modular component of the system when the component is fully assembled.

Another object of the invention is to increase the modularity of the system by providing means for attaching an end panel of a component module to the end of any top, either on the right or left-hand side thereof.

SUMMARY OF THE INVENTION

A modular furniture system is shown of the type having at least two modules adapted to be interconnected. Each module includes a top panel having an upper surface for supporting materials thereon and at least one vertical support panel having an outer planar surface, an inner planar surface, a top edge in contact with the top panel, a bottom edge and opposing side edges. A releasable connector means is provided for joining vertical support panels of adjacently arranged modules in the modular furniture system. The releasable connector means includes a pair of connecting strips which are positionable on the respective inner planar surfaces of the vertical support panels of adjacently arranged modules. The releasable connector means also includes fastening means for securing the connecting strips to the inner planar surfaces of the respective vertical support panels and includes a quick release means for joining the connecting strips.

The fastening means which is used to secure the connecting strips to the inner planar surfaces of the respective vertical support panels can conveniently comprise screw threaded fasteners which pass through the connecting strips, the screw threaded fasteners being received within mating bores provided in the inner planar surfaces of the vertical support panels of the adjacent modules.

Preferably, the connecting strips contact along inner vertical edges thereof. The quick release means can conveniently comprise a plurality of sets of vertically spaced cooperating members which pass in a plane parallel to the inner planar surface of the vertical support panels and which join the inner vertical edges of the connecting strips. Each set of cooperating members preferably includes a cam member and an associated dowel member. The connecting strips have top planar surfaces and bottom planar surfaces. Each dowel member has a head adapted to engage a mating peripheral recess provided in one of the cam members. The cam members are disposed within cylindrical bores provided in the connecting strips perpendicular to the top planar surfaces thereof. Each dowel member terminates in opposing head portions which are adapted to be disposed within a recess of a cooperating cam member. Each cam member is located within a bore provided in the top planar surface of one of the respective connecting strips. The cam members are rotatable in a first direction about an axis extending through the bore in which the cam member is disposed to lock the head portion of a cooperating dowel member within the recess, thereby removably securing the connecting strips together without requiring holes to be drilled in the inner vertical edges of the vertical support panels of the modular furniture system.

The screw threaded fasteners which are used to secure the connecting strips to the inner planar surfaces of the vertical panels are designed to pass through oversize openings provided in the connecting strips which are aligned with the mating bores provided in the vertical panels, whereby the precision required to achieve a flush connection between adjacent panels is reduced.

In the preferred modular furniture system, selected modules include top panels having an upper surface for supporting materials thereon defined by a peripheral edge. An edge cap is provided having an outwardly facing surface joined to a pair of planar, generally perpendicular surfaces. Mounting means are provided for attaching the edge cap along at least a portion of the peripheral edge of a selected top panel, whereby the outwardly facing surface of the edge cap provides a smooth transition from the peripheral edge portion of the top panel to the peripheral edge portion of an adjacent panel when two modules are placed in juxtaposition.

In one embodiment, the modular furniture system comprises at least one module with a top panel having an upper surface for supporting materials thereon defined by a peripheral edge and at least two vertical support panels each of which has an outer planar surface, an inner planar surface, a top edge in contact with the top panel, a bottom edge and opposing side edges. The two vertical support panels are arranged to contact in perpendicular fashion. A corner block is provided for joining selected side edges of the vertical support panels to form a right angle. The corner block has a plurality of vertically spaced quick release connectors on each of two opposing faces thereof for joining the corner block to the side edges of the vertical support panels. Preferably, each corner block has a plurality of vertically spaced dowel members which extend outwardly from each of two opposing faces thereof. The dowel members are received within mating bores provided in the selected side edges of the vertical support panels to be joined, each mating bore being provided with a cam member for engaging a head portion of a selected dowel member.

In another embodiment of the invention, at least two modules are adapted to be interconnected in the modular furniture system. Each module includes a top panel having an upper surface for supporting materials thereon and at least one vertical support panel having an outer planar surface, an inner planar surface, a top edge in contact with the top panel, a bottom edge and opposing side edges. A recess block is provided for joining the vertical support panels of two adjacently arranged modules where one of the vertical support panels is recessed in relation to an adjacent vertical support panel in the modular furniture system. The recess block has an inner planar surface, an outer planar surface, a top edge, a bottom edge and opposing side edges. The recess block is arranged in a plane generally perpendicular to the two vertical support panels being joined with an opposing side edge of one of the vertical support panels contacting the outer planar surface of the recess block and one of the inner planar surface of the other vertical support panel contacting an opposing side edge of the recess block. A pair of connecting strips are positionable on the respective inner planar surface of the recessed vertical support panel and on the opposing side edge of the recess block. Fastening means are provided for securing the connecting strips to the inner planar surface of the respective recessed vertical support panel and to the opposing side edge of the recessed block. A quick release means is provided for joining the connecting strips in order to complete the assembly.

The fastening means used to secure the connecting strips to the recess block and to the recessed vertical support panel are screw threaded fasteners which pass through openings provided in the connecting strips and which are received within mating bores provided in the inner planar surface of the recessed vertical support panel and in an opposing side edge of the recess block, respectively. The connecting strips contact along inner vertical edges thereof. The quick release means is comprised of a plurality of sets of vertically spaced cooperating members which pass in a plane parallel to the inner planar surface of the vertical support panels and join the inner vertical edges of the connecting strips. Each set of cooperating members includes a cam member and an associated dowel member of the type previously described.

The modular furniture system of the invention can also be provided with a pair of side, vertical support panels which are connectable to either of the opposite extents of a front, vertical support panel. Each of the side, vertical support panels has an outer planar surface, an inner planar surface, a top edge in contact with the top panel, a bottom edge and opposing side edges. Each side, vertical support panel can be easily reconfigured for assembly on either the left or right-hand side of any front, vertical support panel by means of a pair of removable completion strips. The removable completion strips are connectable between a selected opposing side edge of each of the side, vertical support panels and an inner planar surface of the front, vertical support panel when the front, vertical support panel is flush with the peripheral edge of the top panel. The completion strips are removable to allow the front, vertical support panel to be recessed with respect to the peripheral edge of the top panel. Opposing side edges of the completion strips are provided with openings for receiving quick release connector means for joining each completion strip to a selected front, vertical support panel and a side, vertical support panel, respectively.

Additional objects, features and advantages will be apparent in the written description which follows.

BRIEF DESCRIPTION OF THE DRAWINGS

FIG. 3 shows the quick release means used to join the connecting strips of the releasable connector means of the invention;

FIG. 3a shows the cam and dowel members of the quick release means in a first, unlocked position;

FIG. 3b is a view similar to FIG. 3a but showing the cam member of the quick release means rotated to a second, locked position;

FIG. 4 shows the connecting strips, fastening means and quick release means which make up the releasable connector means of the invention, in exploded fashion;

FIG. 5 shows the releasable connector means in the assembled condition joining two vertical support panels of the modular furniture system;

FIG. 6 is an exploded view of the edge cap which is used to provide a transition between the peripheral edge portions of adjacent panels when two modules are assembled in the modular furniture system of the invention;

FIG. 7 is a simplified cross-sectional view showing the assembly of a radiussed edge cap such as that shown in FIG. 6;

FIG. 8 is a cross-sectional view similar to FIG. 7 showing the assembly of a planar edge cap;

FIG. 11 shows the side edges of a front and side vertical support panel which are to be joined by a corner block in the modular furniture system of the invention;

FIG. 12 shows the installed corner block of the invention which is used to join the vertical support panels of FIG. 11;

FIG. 13 is a cross-sectional view of the installed corner block and connectors used to join the vertical support panels of FIG. 12;

FIG. 14 is a cross-sectional view similar to FIG. 13 but showing one of the vertical support panels being repositioned in a recessed location;

FIG. 15 is a perspective view, partially brokenaway of the corner block and recessed front, vertical support panel;

FIG. 16 is a perspective view, partially brokenaway of a module of the modular furniture system of the invention showing one of the side, vertical support panels including the removable completion strip thereof;

FIG. 17 is a view similar to FIG. 16 but showing the side, vertical support panel and completion strip in exploded fashion;

FIG. 20 shows another configuration of the modular furniture system of the invention in which extended vertical support panels are employed;

FIG. 21 is an isolated view of one of the extended vertical support panels of FIG. 20, partially broken away, showing the installation of a desk work surface;

FIG. 22 is an isolated view of the mounting means used to mount the desk work surface to the extended vertical support panel of FIG. 21;

DETAILED DESCRIPTION OF THE INVENTION

Figure 1:
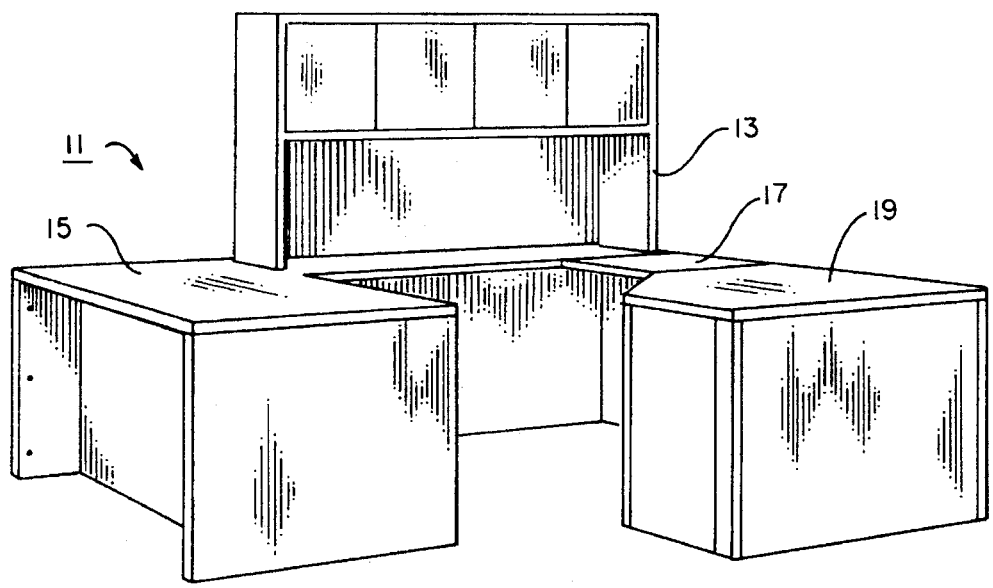
FIG. 1 shows one configuration of the modular furniture system of the invention.

FIG. 1 shows the modular furniture system of the invention in a first configuration designated generally as 11. The system 11 includes a hutch 13 which is joined to a desk shell 15 on one side and by means of a work surface station 17 to a corner workstation 19 on an opposite side.

Figure 2:
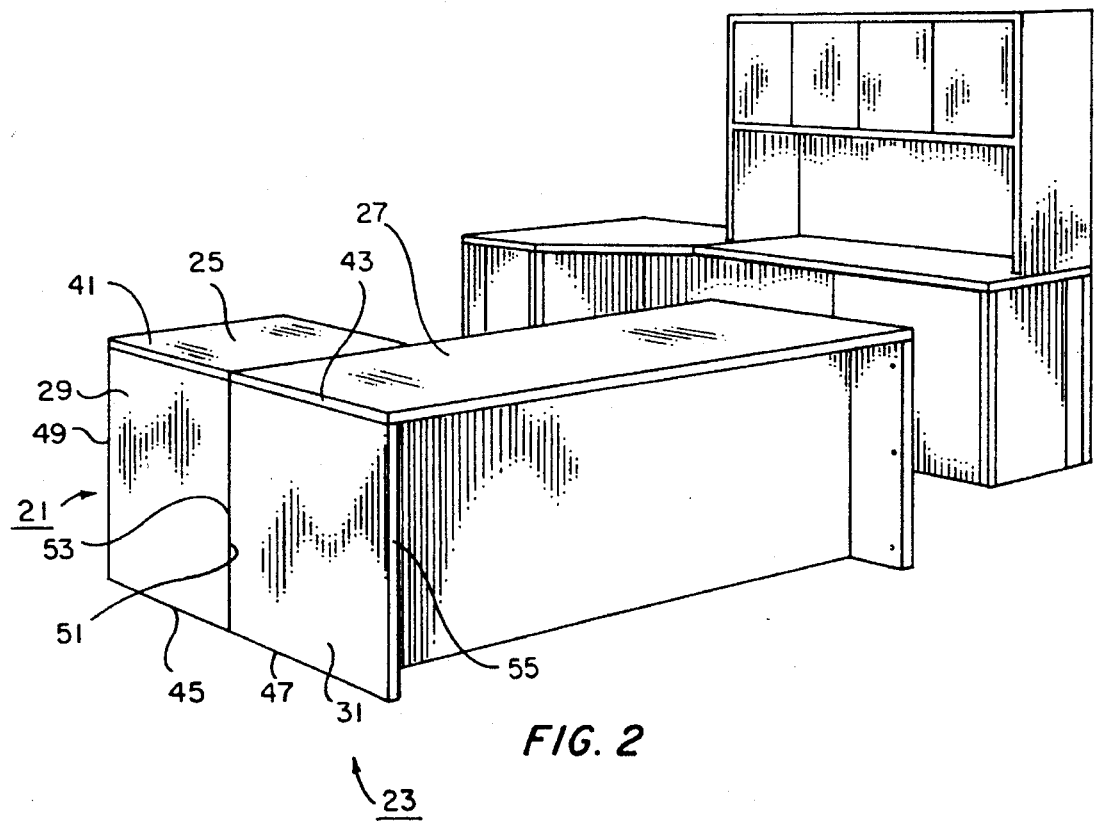
FIG. 2 shows the modules of FIG. 1 arranged in an alternative configuration.

FIG. 2 shows another configuration of the modular furniture system of FIG. 1. At least two modules 21, 23 are interconnected. Each module includes a top panel having an upper surface 25, 27 for supporting materials thereon. Each module also has at least one vertical support panel 29, 31 having an outer planar surface (33, 35 in FIG. 4), an inner planar surface 37, 39, a top edge 41, 43 (FIG. 2) in contact with a top panel, a bottom edge 45, 47 and opposing side edges 49, 51 and 53, 55, respectively.

As shown in FIGS. 3–5, a releasable connector means is provided for joining the vertical support panels 29, 31 of adjacently arranged modules 21, 23 in the modular furniture system. The vertical support panels 29, 31 are coplanar and contact along the respective side edges 51, 53 thereof. The releasable connector means includes a pair of connecting strips 57, 59 which are positionable on the respective inner planar surfaces 37, 39 of the vertical support panels 29, 31 of adjacently arranged modules. Once assembled, the connecting strips 57, 59 at least partially overlap a contact region (61 in FIG. 5) defined by the adjacently arranged, opposing side edges 51, 53 of the adjacently arranged modules. In the example shown in FIG. 5, the connecting strip 57 overlaps the contact region 61.

The releasable connector means also includes fastening means for securing the connecting strips 57, 59 to the inner planar surfaces 37, 39 of the respective vertical support panels and includes quick release means for joining each pair of connecting strips 57, 59. The fastening means used to secure the connecting strips 57, 59 to the inner planar surfaces 37, 39 of the respective vertical support panels can comprise screw threaded fasteners 63, 65 which pass through openings 67, 69 provided in the connecting strips. The screw threaded fasteners 63, 65 are received within mating bores 71, 73 which are provided in the inner planar surfaces 37, 39 of the vertical support panels 29, 31 of the adjacent modules. In the example shown in FIG. 4, the bore 71 is provided with a pre-threaded press fitting 75 which is selectively sized to engage screw 63. As shown in FIG. 4, the mating bores are vertically spaced at regular intervals along the inner planar surfaces of the vertical support panels adjacent the opposing side edges 51, 53 thereof. Three vertically spaced bores are illustrated in FIG. 4. Openings 67, 69 are offset from the centerline of each connecting strip so that connecting strip 57 overlaps the contact region 61 of the strips in the assembled condition.

The quick release means is comprised of a plurality of sets of vertically spaced cooperating members which pass in a plane parallel to the inner planar surface of the vertical support panels and which join the inner vertical edges 96, 98 (FIG. 4) of the connecting strips 57, 59. As shown in FIG. 3, each set of cooperating members includes a cam member 83 and an associated dowel member 85. Each dowel member 85 (FIG. 3) has a head 95 adapted to engage a mating peripheral recess 97 provided in one of the cam members 83. Each connecting strip 57, 59 has a top planar surface 87, 89 and a bottom planar surface 91, 93. The cam members are disposed within cylindrical bores (e.g., bores 99, 101 in FIG. 4) provided in the connecting strips perpendicular to the top planar surfaces thereof. In the embodiment of FIG. 4, each strip is actually provided with three, vertically spaced cylindrical bores for receiving the cam members 83. Note that while the inner vertical edges 96, 98 of the connecting strips are provided with horizontal bores (e.g. bore 100 in FIG. 4), that it is not necessary to drill openings in the side edges 51, 53 of the vertical support panels 29, 31.

Preferably, each dowel member 85 terminates in opposing head portions 95, 103 which are adapted to be disposed within a recess of a cooperating cam member when the cam member is located within a bore provided in the top planar surface of a respective connecting strip. As illustrated in FIGS. 3a and 3b, each cam member 83 is rotatable in a first direction, illustrated by the arrow in FIG. 3b, about an axis 105 extending through the bore (72, 74 in FIG. 4) in which the cam member is disposed to lock the head portion (95 in FIGS. 3 and 4) of a cooperating dowel member 85 within said recess to thereby removably secure the connecting strips 57, 59 together without requiring holes to be drilled in the side edges 51, 53 of the vertical support panels 37, 39 of the modular furniture system. Notice that as the cam member 83 rotates, the dowel member is pulled inward a distance illustrated as "d" in FIG. 3b. Quick release means comprised by cam members 83 and dowels 85 are known in the art and are described, for example in U.S. Pat. Nos. 4,923,321; 4,886,326; and 4,869,564, the disclosure of which is incorporated herein by reference.

One problem with the prior art quick to assemble furniture systems employing knock-down panels is that panels are predrilled in the factory and utilize fittings in which tolerances in the drilling or shaping of the panels must be absorbed by the fittings or difficulty occurs in assembly. In the modular furniture system of the invention, the screw threaded fasteners 63, 65 which are used to secure the connecting strips 57, 59 pass through intentionally oversized bores 67, 69 provided in the connecting strips. The oversize bores 67, 69 are aligned with the mating bores 71, 73 provided in the vertical panels 29, 31, whereby the precision required to achieve a flush connection between adjacent panels is reduced.

FIGS. 6–8 illustrate another feature of the invention. In the modular furniture system illustrated in FIG. 6, a pair of modules are adapted to be interconnected wherein each module includes a top panel 107, 109 having an upper surface 111, 113 for supporting materials thereon, each of the upper surfaces being defined by means of a peripheral edge 115, 117. In this case, the peripheral edge 117 is radiussed while the peripheral edge 115 is a straight, generally planar surface.

An edge cap 119 is provided having a curved, outwardly facing surface 121 joined to a pair of planar, generally perpendicular surfaces 123, 125. Mounting means are provided for attaching the edge cap 119 along at least a portion of the peripheral edge 115 of a selected top panel 107, whereby the outwardly facing surface 121 of the edge cap 119 provides a smooth transition from the peripheral edge portion of the selected top panel 107 to the peripheral edge portion 117 of an adjacent panel 109 when two modules are placed in juxtaposition.

The mounting means can conveniently comprise a plurality of horizontally spaced cooperating members which pass in a plane parallel to the upper surface 111, 113 of the top panels 107, 109 of the adjacent modules. Each set of cooperating members preferably includes a cam member 127 and an associated dowel member 129. In the embodiment of FIG. 6, each dowel member 129 is affixed to a rear, perpendicular surface 125 of the edge cap 119 and terminates in a head portion 131 which extends outwardly therefrom. The head portion 131 is adapted to engage a mating peripheral recess 133 provided in one of the cam members 127, as previously described. The cam member 127 is disposed within a cylindrical bore 135 provided in the top panel 107. The cam member is rotatable in a first direction about an axis 137 extending through the bore 135 to lock the head portion 131 of the cooperating dowel member 129 within the recess and removably secure the edge cap 119 to the top panel 107.

The dowel members 129 shown in the embodiment of FIG. 6 differ from the dowel members 85 of FIG. 3 in having a head portion 131 at one extent and threaded opposite extents 139 (FIG. 6). The threaded opposite extents 139 are matingly engaged within the press-fit receptacles 141 which are received within openings 143 provided in the perpendicular surfaces 125 of the edge cap 119.

While edge cap 119 is illustrated as having a radiussed outwardly facing surface 121, the edge cap could also be provided with a straight, generally planar outer surface, illustrated at 145 in FIG. 6. FIGS. 7 and 8 are cross-sectional views of the radiussed and planar edge caps joined to top panel 107 by a dowel member 129.

Figure 9:
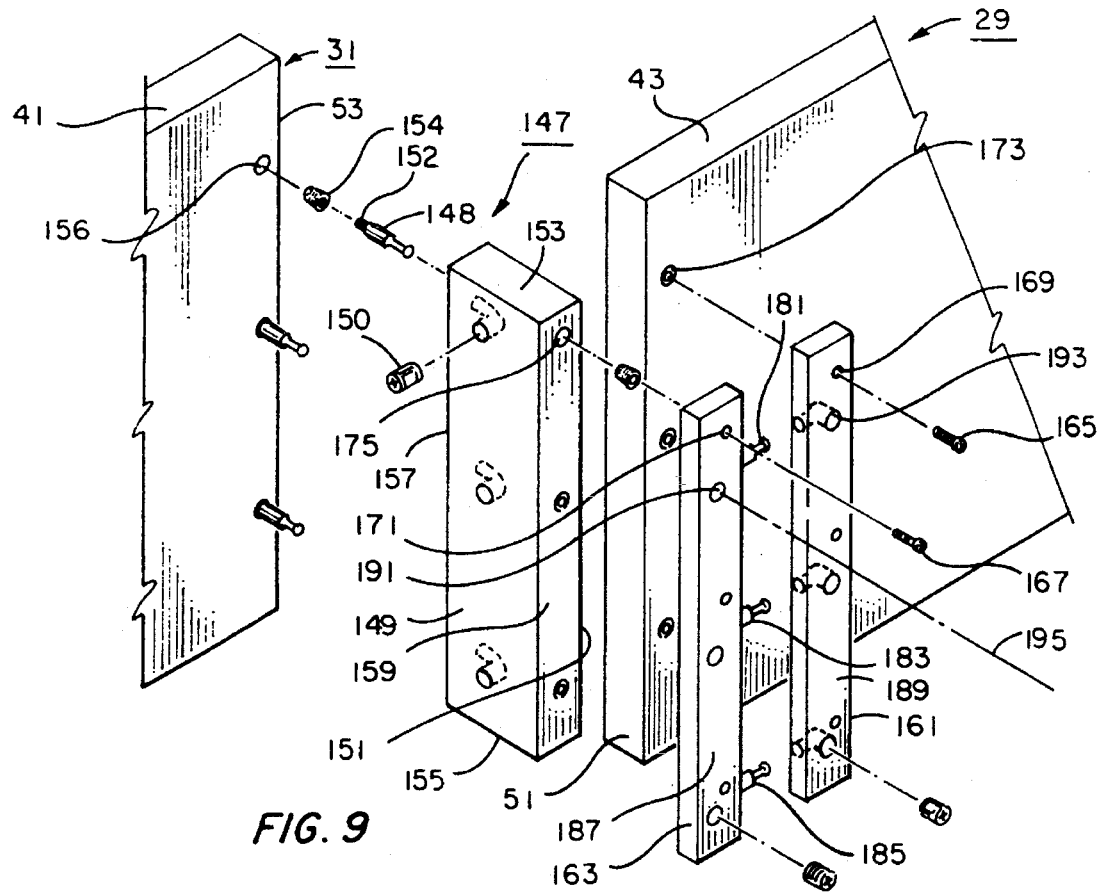
FIG. 9 is an exploded view of the recess block which is used to join the vertical support panels of two adjacently arranged modules in the modular furniture system of the invention.
Figure 10:
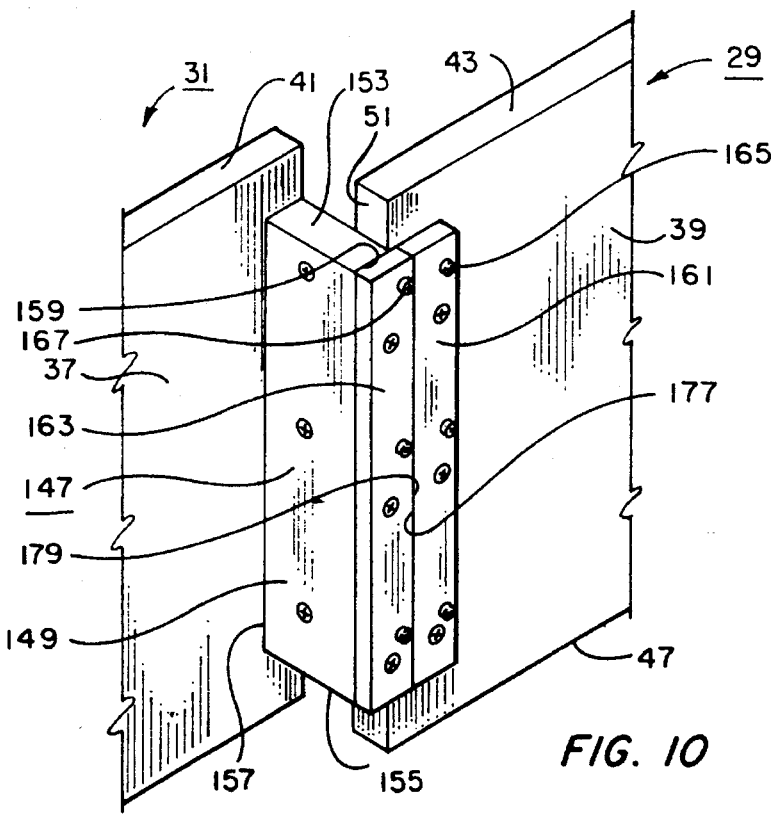
FIG. 10 is a view similar to FIG. 9 but showing the recess block in the assembled position.

FIGS. 9 and 10 illustrate Applicant's recess block 147 which is used to connect a recessed vertical support panel 29 to a non-recessed vertical support panel 31. The recess block 147 of the invention provides a convenient inlet for wire and cable passing from the exterior to the interior of a selected module. As seen in FIG. 9, the recess block 147 has an inner planar surface 149, and outer planar surface 151, a top edge 153, a bottom edge 155 and opposing side edges 157, 159. The recess block 147 is arranged in a plane generally perpendicular to the two vertical support panels 29, 31 being joined.

An opposing side edge (51 in FIG. 10) of one of the vertical support panels 29 contacts the outer planar surface 151 of the recess block 147 and one of the inner planar surfaces 37 of the other vertical support panel 31 contacts an opposing side edge 157 of the recess block 147. Recess block 147 is joined to vertical support panel 37 by means of dowel members 148 and cam members 150 of the type previously described. Each dowel member 148 has a threaded extent 152 engaged by a threaded insert 154 which is, in turn, received within an opening 156 provided in the inner planar surface of the vertical support panel 31.

A pair of connecting strips 161, 163 are positionable on the respective inner planar surface 39 of the vertical support panel 43 and on an opposing side edge 159 of the recess block 147 in order to complete the assembly. Fastening means are provided for securing the connecting strips 161, 163 to the inner planar surface 39 of the vertical support panel 29 and to the opposing side edge 159 of the recess block 147. A quick release means is also provided for joining the connecting strips.

The fastening means used to secure the connecting strips 161, 163 are preferably screw threaded fasteners, e.g., 165, 167 in FIG. 9, which pass through openings 169, 171 in the connecting strips and are received within mating bores 173, 175 provided in the inner planar surface 39 of the recessed vertical support panel 29 and in an opposing side edge 159 of the recess block 147, respectively. As shown in FIG. 10, the connecting strips 161, 163 contact along inner vertical edges 177, 179 thereof. The connecting strip 161 also overlaps the contact region of the vertical support panel 29 and the recess block 147.

The quick release means preferably comprises a plurality of sets of vertically spaced cooperating members 181, 183, 185 in FIG. 9, which pass in a plane parallel to the inner planar surfaces 187, 189 of the connecting strips and join the inner vertical edges 177, 179 (FIG. 10) of the connecting strips. The quick release means includes a cam member and an associated dowel member, such as the previously described members 83, 85 in FIG. 3. Each dowel member has a head portion which is adapted to engage a mating peripheral recess provided in one of the cam members. The cam members are disposed within cylindrical bores, such as bores 191, 193 in FIG. 9, provided in the connecting strips perpendicular to the inner planar surfaces 187, 189, thereof. As previously described in FIG. 3, each dowel member 85 terminates in an opposing head portion 95, 103 which is adapted to be disposed within the peripheral recess 97 of the cooperating cam member 83. The cam members are rotatable in a first direction about an axis (195 in FIG. 9) extending through the bore 191 in which the cam member is disposed to lock the head portion of a cooperating dowel member within the recess and thereby removably secure the connecting strips 161, 163 together.

The screw threaded fasteners 165, 167 which are used to secure the connecting strips to the vertical panel and recess block preferably pass through oversize openings 169, 171 provided in the connecting strips which are aligned with the mating bores 173, 175 provided in the panel and edge of the recess block, respectively, to decrease the degree of precision required to achieve a flush connection.

Figure 19:
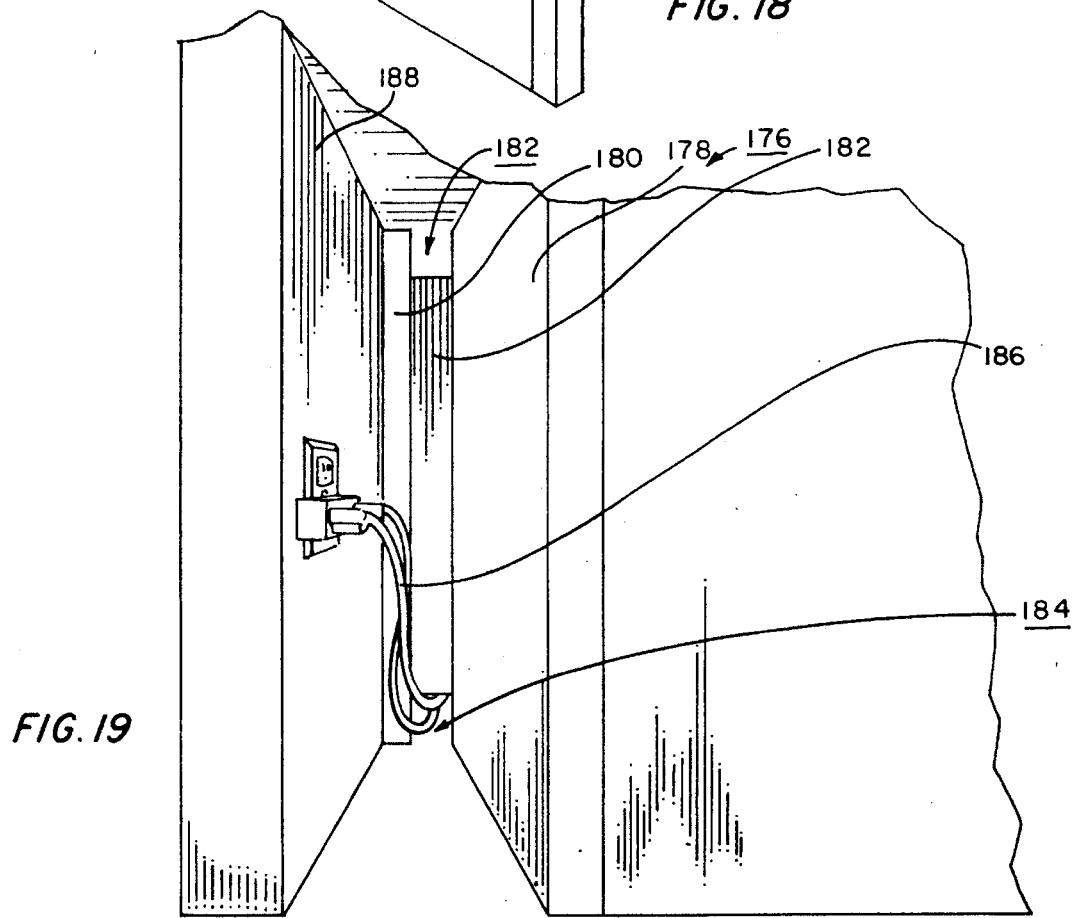
FIG. 19 is a partial, perspective view of one module of the modular furniture system of the invention showing the recess block which is used to join the front, vertical support panels of two adjacently arranged modules.

Note that when the recess block is installed, as shown in FIG. 10, that the block bottom edge 155 is spaced apart from the floor and the top edge 153 is also lower than the top edges 41, 43 to allow access for wires and cables which are to be run to the inside of the assembled unit. This feature is also illustrated in FIG. 19 with respect to the assembled module 176. Module 176 has a front vertical support panel 178 which is joined to the front vertical support panel 180 by means of the assembled recess block 182. An opening 184 provided at the base of the recess block 182 and an opening 182 at the top thereof allow wires 186 to pass from the wall 188 to the interior of the modular unit.

FIGS. 11 and 12 show a pair of vertical support panels 197, 199 arranged to contact in perpendicular fashion. Each panel, such as panel 197, has an outer planar surface 201, and inner planar surface 203, a top edge 205 adapted to contact a top panel (not shown), a bottom edge 207 and opposing side edges (209 shown in FIG. 11). A corner block 213 (FIG. 12) is provided for joining selected side edges 209, 211 of the respective vertical support panels 197, 199 to form a right angle connection.

The corner block 213 has a plurality of vertically spaced quick release connectors on each of two opposing faces (215, 217 in FIG. 13) for joining the corner block to the side edges of the vertical support panels. Preferably, the quick release connectors comprise a plurality of vertically spaced dowel members, such as members 85 in FIG. 3 which extend outwardly from each of two opposing faces of the corner block 213. In this case, each dowel member (219 in FIG. 11) has a threaded head portion 221 which is engaged within a threaded bore (223 in FIG. 13) for mounting the dowel member on the corner block 213. The dowel members 219 are received within mating bores (225 in FIG. 13) provided in selected side edges, e.g. edges 209, 211 in FIG. 11, of the vertical support panels to be joined. Each mating bore is provided with a cam member (shown in dotted lines as 227 in FIG. 11) for engaging a head portion of a selected dowel member.

As shown in FIG. 14, each module can be provided with a front vertical support panel 229 which is joined at opposite extents thereof, in perpendicular fashion, to a pair of oppositely arranged, side vertical support panels, such as panel 231. Each of the oppositely arranged, side vertical support panels 231 is preferably provided with at least one set of vertically spaced connecting points (233 in FIG. 14) for connecting the front vertical support panel 229 and side vertical support panel 231 with the front vertical support panel 229 being recessed with respect to the oppositely arranged side vertical support panels. In the embodiment shown in FIG. 14, the connecting point 233 is a threaded bore for receiving the threaded head portion of the dowel member used to engage a mating cam member of the type previously described. As shown in FIG. 15, the corner block 213 thus allows the front vertical support panel 229 to be recessed with respect to the opposing side vertical support panels 231. The exposed face 235 of the corner block 213 is not drilled or tapped and provides a pleasing external appearance for the unit.

FIGS. 16 and 17 illustrate one desk module used in the furniture system of the invention, the desk module including a top panel 237 having an upper surface defined by a peripheral edge 241 for supporting materials thereon. The unit also has a front vertical support panel 243 (FIG. 17) which has an outer planar surface 245, and inner planar surface 247, a top edge 249, a bottom edge 251 and opposing side edges 253, 255 (shown broken away).

Figure 18:
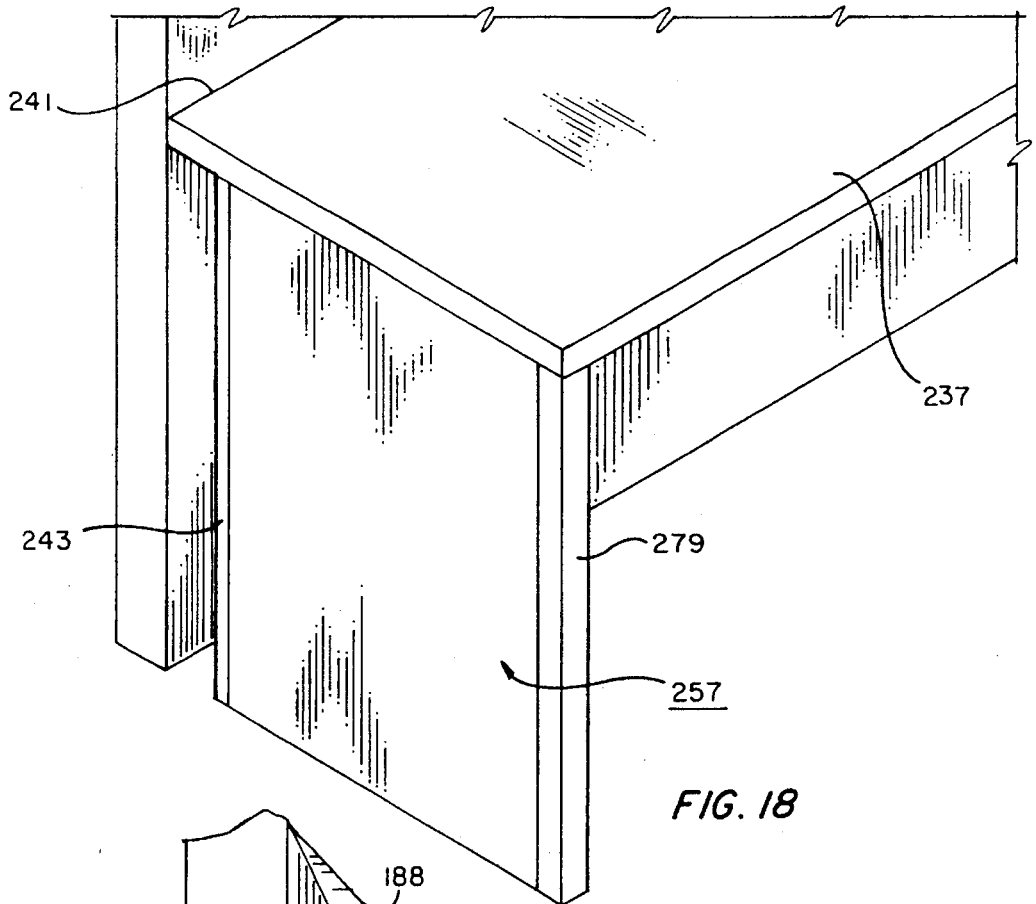
FIG. 18 is another view of the module of FIGS. 6–17 but without the completion strip.

A pair of reversible, side vertical support panels (257 shown in FIGS. 16 and 17) are connectable to either of the opposite extents of the front vertical support panel 243. Each of the reversible vertical support panels has an outer planar surface 259, an inner planar surface 261, a top edge 263, a bottom edge 265 and opposing side edges 267, 269. A removable completion strip 271 of the same height but of less width than the side vertical support panel 257 is connectable between the opposing side edge 267 of the side vertical support panel 257 and the inner planar surface 247 of the front vertical support panel 243 when the front vertical support panel is flush with the peripheral edge 241 of the top panel 237. The completion strips 271 are removable to allow the front vertical support panel 243 to be recessed with respect to the peripheral edge 241 of the top panel 237. The recessed position of the assembled module is illustrated in FIG. 18.

The opposing side edges of the completion strip (273, 275 in FIG. 17) are preferably adapted to receive quick release connectors for joining each completion strip to a selected front vertical support panel 243 and to a reversible vertical support panel 257, respectively, of the modular furniture system. The quick release connectors are identical to those previously described with respect to FIGS. 3 and 11–14 and will not again be described. Preferably, vertically spaced dowel members 272 carried on the front vertical support panel 243 have head portions which are received within mating bores 274 in one edge of the completion strip 271. Dowel members 276 extend from the opposing edge of the completion strip 271 and are received within mating bores 278 provided in the side vertical support panel 257.

Note that while the opposing side edge 267 of the reversible vertical support panel 257 is provided with bores for receiving the dowel members 276 of the completion strip 271, that the opposing side edge 269 has vertically spaced horizontal bores 280 for receiving cooperating dowel members 282 mounted on a corner block 279. In this way, the support panel 257 can be rotated 180° and installed in identical fashion at the opposite extent of the top panel 237. This feature increases the modularity of the entire system due to the capability of attaching a side vertical support panel to the end of any top panel, either on the right or left-hand side. The reversible vertical support panels 257 also increase the wire management capabilities of the unit by allowing access behind the front vertical support panel when the panel is in the recessed position. When wire access is not required, the front vertical support panel can be moved back to the position shown in FIG. 16, flush with the peripheral edge 241 of the top panel 237.

FIG. 20 shows another modular furniture arrangement of the invention, designated generally as 281. The arrangement 281 is similar to that of FIGS. 1 and 2 except that the vertical support panels (e.g. panels 283, 285, 287) are of extended height for increased privacy. The opposing side edges (e.g. edges 289, 291) of adjacent panels are joined by quick release connectors of the type described in FIG. 3a.

As shown in FIG. 21, vertical support panel 283 has vertically spaced openings (e.g., openings 293, 295) for engaging dowel members 297, 299 of an end strip 301. A work surface 303 attaches to the vertical support panel 283 by means of mounting brackets 305, 307.

FIG. 22 shows the mounting bracket 305 in close-up detail. A screw 309 passes through a top opening 311 of the bracket 305 and is matingly engaged within a threaded insert 313 which, in turn, is received within bore 315 located in the lower planar surface 317 of the work surface 303. Screw threaded fasteners 319, 321 pass through openings 320, 322 of the mounting bracket are similarly received within mating threaded bores provided in the inner planar surface 323 of the vertical support panel 283.

Figure 23:
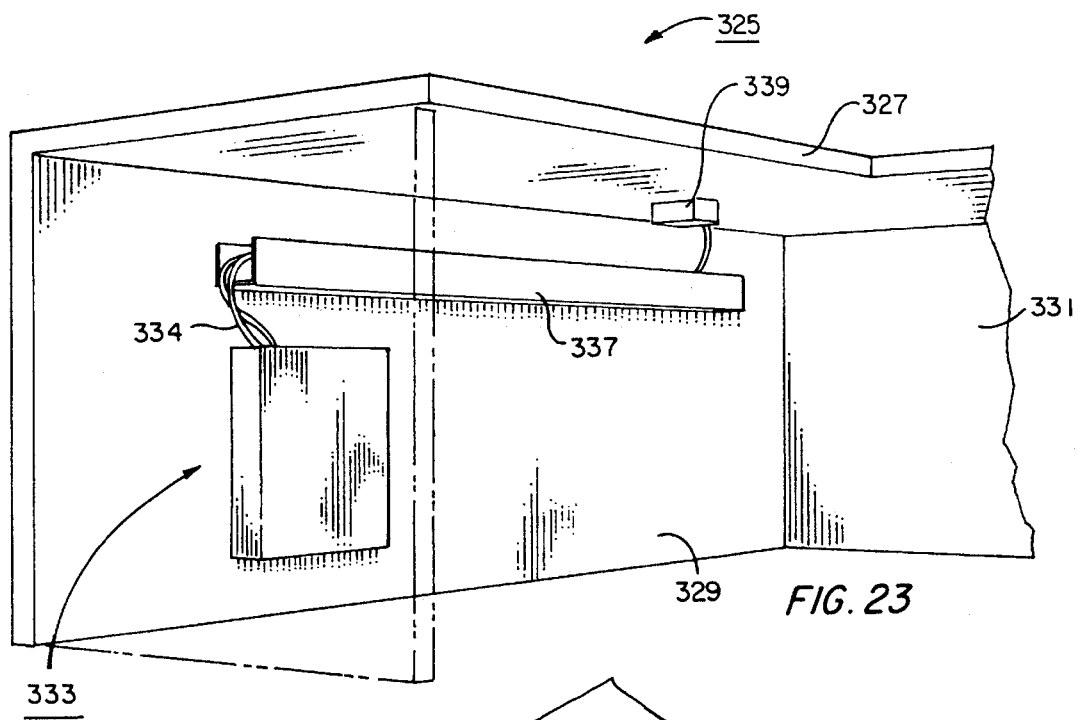
FIG. 23 is a perspective view, partly broken away of one module of the modular furniture system of the invention showing an installed wire box which provides inlet of wire and cable to the inside of a modular component of the furniture system of the invention.

FIG. 23 shows another modular unit of the invention, designated generally as 325. The unit 325 has a work surface 327 supported by a front vertical support panel 329 and opposing side vertical support panels (331 shown in solid lines). A wire box 333 is provided on the inner planar surface 335 of the front vertical support panel 329 for improved wire management. In the embodiment of FIG. 23, the wires 334 exiting the wire box 333 pass through a molded channel 337 to a work unit 339.

Figure 24:
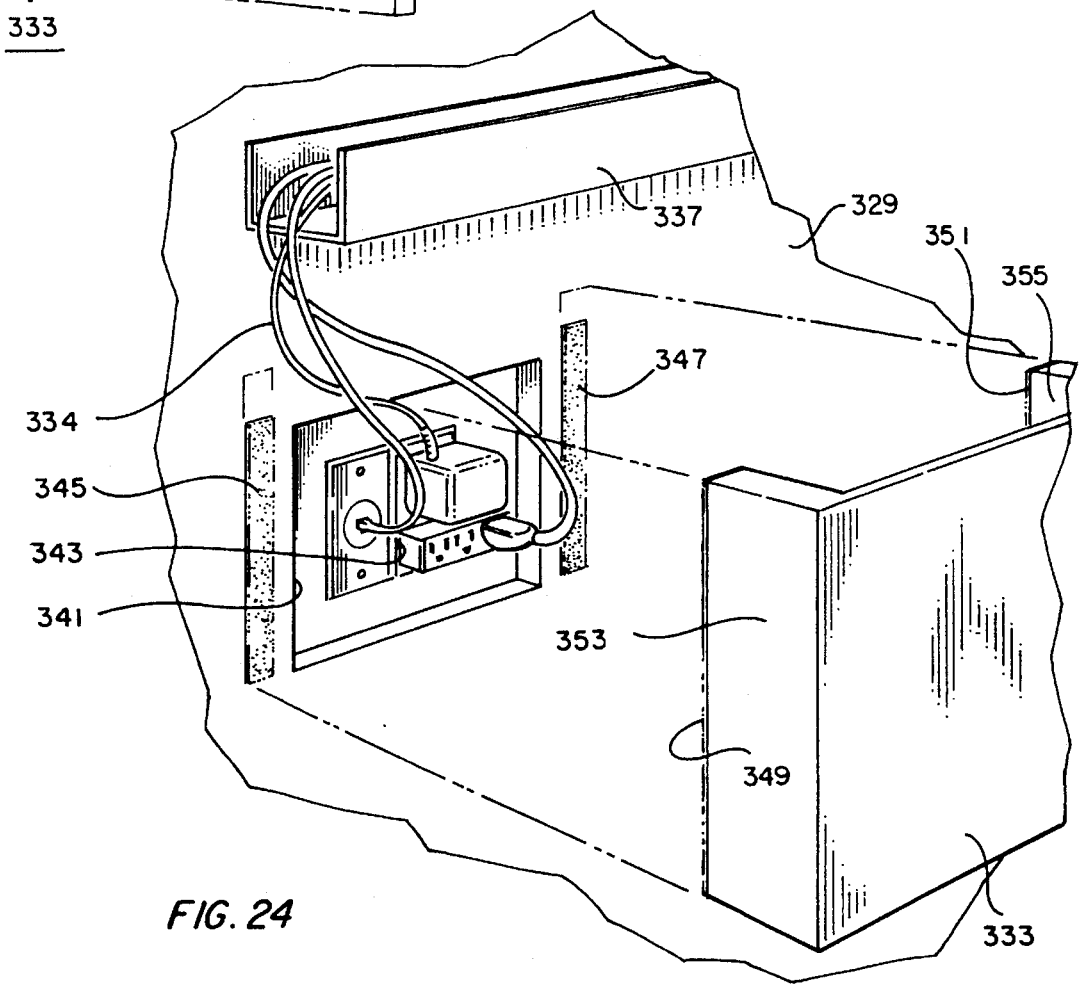
FIG. 24 is an isolated view of the wire box used in the furniture module of FIG. 23 but showing the wire box of the invention in exploded fashion.

FIG. 24 shows the wire box 333 in exploded fashion. An opening 341 is cut in the vertical support panel 329 to provide access to power outlets 343. Velcro strips 345, 347 having hook and loop type fasteners engage mating Velcro strips 349, 351 provided on the wire box side panels 353, 355 for removably securing the wire box 333 in the position shown in FIG. 23. The wire box 333 provides convenient access to the power outlets 343 and enhances the aesthetics of the assembly while conveniently routing wires and cables to needed work units. The wire box 333 can be provided of the same wood or finish as the remainder of the modular unit.

An invention has been provided with several advantages. The modular furniture system of the invention is simple in design and economical to manufacture. The system is easily reconfigured to provide a variety of workstation requirements. A variety of workstation configurations can be provided from a relatively small number of basic modular components which can be fabricated for shipment in the knock-down condition and which can be assembled in the field with relative ease. The connecting means used to join panel components of adjacent modules does not require boring holes in the end surfaces of the panels and provides increased flexibility for the system without marring the attractiveness of the components. The edge cap allows edges of adjacent component modules to fit together against flat edged surfaces, radiussed edged surfaces, and the like. The recess block can be used to recess the front panel of a desk module to provide improved wire management capabilities. The reversible end panels allow an end panel component to be attached to the end of any top panel, either on the right or left-hand side thereof. The corner block used to connect panels at 90° angles also provides improved wire management capabilities, allowing access to wall outlets while keeping the system or individual modules thereof positioned against a wall, thereby concealing all wires and cables.

Vertical support panels of extended height can be utilized in the system for increased privacy, if desired. A wire box, installed on the inner planar surface of selected vertical support panels, provides ease of access to power outlets and flexible wire management capabilities while maintaining the overall aesthetic appearance qualities of the modular furniture system of the invention.

While the invention has been shown in only one of its forms, it is not thus limited but is susceptible to various changes and modifications without departing from the spirit thereof.

What is claimed is:

1. In a recinfigurable desk furniture system of the type having at least two modules adapted to be interconnected, each module including a desk top panel having an upper surface defined by a peripheral edge for supporting materials thereon and a front vertical support panel having an outer planar surface, an inner planar surface, a top edge in contact with the desk top panel, a bottom edge and opposing side edges which define opposite extents of the front vertical support panel, the improvement comprising:

a pair of reversible, side vertical support panels assembleable to either of the opposite extents of the front vertical support panel, each of the reversible, side vertical support panels having an outer planar surface, an inner planer surface, a top edge contactable with the desk top panel, a bottom edge and opposing side edges;

a pair of removable completion strips assembleable between a selected opposing side edge of each reversible, side vertical support panel and an inner planar surface of the front vertical support panel when the front vertical support panel is flush with the peripheral edge of the desk top panel, the completion strips being removable to allow the front vertical support panel to be recessed with respect to the peripheral edge of the desk top panel.

2. The modular furniture system of claim 1, wherein the opposing side edges of the completion strips are provided with openings for receiving quick release connector means for joining each completion strip to a selected front vertical panel and reversible vertical panel, respectively, of the modular furniture system.

3. The modular furniture system of claim 2, wherein each of the quick release connector means comprises a cam member and an associated dowel member, each dowel member having a head engaging a mating peripheral recess provided in one of the cam members, the cam members being disposed within cylindrical bores provided in the front vertical support panel and reversible vertical panels.

4. The modular furniture system of claim 3, wherein each dowel member terminates in opposing head portions which are disposed within a recess of a cooperating cam member, the cam members being rotatable in a first direction about an axis extending through the bore in which said cam member is disposed to lock the head portion of a cooperating dowel member within said recess and thereby removably secure the completion strips between the reversible vertical panels and the front vertical panel, respectively.

* * * * *